United States Patent
Masuda et al.

(10) Patent No.: US 7,173,630 B2
(45) Date of Patent: Feb. 6, 2007

(54) INFORMATION PROCESSING APPARATUS AND METHOD, AND INFORMATION PROCESSING PROGRAM

(75) Inventors: Hiroki Masuda, Kanagawa (JP); Kensaku Ishizuka, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/268,521

(22) Filed: Oct. 10, 2002

(65) Prior Publication Data

US 2003/0090493 A1  May 15, 2003

(30) Foreign Application Priority Data

Oct. 11, 2001 (JP) .............................. 2001-314609

(51) Int. Cl.
G09G 5/00 (2006.01)
(52) U.S. Cl. ..................................................... 345/581
(58) Field of Classification Search ........ 345/581–618, 345/713, 135–138, 165
See application file for complete search history.

(56) References Cited

U.S. PATENT DOCUMENTS 5,161,213 A * 11/1992 Knowlton ................... 345/428

FOREIGN PATENT DOCUMENTS

| JP | 06-060065 | 3/1994 |
|---|---|---|
| JP | 08-077242 | 3/1996 |
| JP | 11-328167 | 11/1999 |
| JP | 2000-066650 | 3/2000 |

OTHER PUBLICATIONS

Microsoft, PhotoDraw, 1999, Microsoft, pertinent pages/information are/is given in office action.*

* cited by examiner

Primary Examiner—Kee M. Tung
Assistant Examiner—G. F. Cunningham
(74) Attorney, Agent, or Firm—Oblon, Spivak, McClelland, Maier & Neustadt, ,P.C.

(57) ABSTRACT

An improved convenience is attained in adding a character or figure to a picture with an improved convenience as follows: When a mode for addition of a character to a picture display area is selected, an attribute processor (101) outputs a plurality of sample characters whose attributes are different from each other, a display control unit (102) displays the plurality of sample characters different in attribute from each other in descending order starting with the most frequently used one in the form of a list in the sample character display area. When a predetermined sample character is selected using a touch pad (6) and a position where a character is actually added in the picture display area is selected, it becomes possible to actually add a character on the basis of the attribute of the selected sample character first at the selected position, and the attribute processor (101) provides such a control as to add a character entered from a keyboard (5) on the basis of the attribute of the sample character.

7 Claims, 18 Drawing Sheets

INFORMATION PROCESSING APPARATUS AND METHOD, AND INFORMATION PROCESSING PROGRAM

BACKGROUND OF THE INVENTION

1. Field of the Invention

The present invention relates to an information processing apparatus and method and an information processing program, and more particularly, to an information processing apparatus and method, and an information processing program, capable of adding or changing an intended object to be displayed in a first display area on a display means on which picture information is being displayed.

2. Description of the Related Art

Recently, there has been a picture viewer application software for use in the information processor such as a personal computer (PC) to arrange picture files for display.

Running an electronic photo album software as an example of the picture viewer application software, the information processor can display a picture file acquired from a digital still camera for example so that the user can view it as if he or she viewed an ordinary photo album. Also, the information processor can add an object such as a character or figure to a display area where a target picture is being displayed, modify the attribute of the object, make simple correction and picture processing of the on-screen target picture.

The information processor can give effects to a character added to the display area where a picture is being displayed by setting attributes such as shadow, fringe, gradation, color, etc. of the character.

When changing the attributes of an added character, the above information processor can set various attributes such as shadow, fringe, gradation, color, etc. of the added character but it handles the attributes independently of each other. Therefore, the information processor has to have the user to set the attributes separately, and the attributes are combined in a great number of ways. So, the information processor cannot be used with a high convenience.

Further, the information processor can hardly allow the user to imagine any character changed by setting its many attributes and thus the interaction with many attributes is not advantageous from the standpoint of the user interface as well.

OBJECT AND SUMMARY OF THE INVENTION

Accordingly, the present invention has an object to overcome the above-mentioned drawbacks of the related art by providing an information processing apparatus and method, and an information processing program, which can add a character, figure or the like to a picture with an improved convenience.

The above object can be attained by providing an information processor which adds or change a target object to be displayed in a first display area on a display means on which picture information is being displayed, the apparatus including according to the present invention:

an operating means;

an attribute processing means for outputting a plurality of sample objects having different attributes;

a display control means for displaying the plurality of sample objects having different attributes, supplied from the attribute processing means, in a predetermined order in the form of a list in a second display area of a display means; and a control means for providing such a control as to add or change the target object to be displayed in the first display area of the display means on the basis of the attribute of one selected, using the operating means, from the plurality of sample objects being displayed in the second display area of the display means and having the different attributes.

In the above information processor, the plurality of sample objects having different attributes is outputted, displayed in the predetermined order in the form of a list in the second display area of the display means, and the target object to be displayed in the first display area of the display means is added or changed on the basis of the attribute of one selected, using the operating means, from the plurality of sample objects being displayed and having the different attributes.

Also, the above object can be attained by providing an information processing method of adding or changing, using an operating means, a target object to be displayed in a first display area on a display means on which picture information is being, the method including, according to the present invention, steps of:

generating a plurality of sample objects having different attributes;

displaying the plurality of sample objects having different attributes, supplied from the attribute processing means, in a predetermined order in the form of a list in a second display area of a display means; and providing such a control as to add or change the target object to be displayed in the first display area of the display means on the basis of the attribute of one selected, using the operating means, from the plurality of sample objects being displayed in the second display area of the display means and having the different attributes.

In the above information processing method, the plurality of sample objects having different attributes is outputted, displayed in the predetermined order in the form of a list in the second display area of the display means, and the target object to be displayed in the first display area of the display means is added or changed on the basis of the attribute of one selected, using the operating means, from the plurality of sample objects being displayed and having the different attributes.

Also, the above object can be attained by providing an information processing program for adding or changing, using an operating means, a target object to be displayed in a first display area on a display means on which picture information is being, the program including, according to the present invention, steps of:

generating a plurality of sample objects having different attributes;

displaying the plurality of sample objects having different attributes, supplied from the attribute processing means, in a predetermined order in the form of a list in a second display area of a display means; and providing such a control as to add or change the target object to be displayed in the first display area of the display means on the basis of the attribute of one selected, using the operating means, from the plurality of sample objects being displayed in the second display area of the display means and having the different attributes.

In the above information processing program, the plurality of sample objects having different attributes is outputted, displayed in the predetermined order in the form of a list in the second display area of the display means, and the target object to be displayed in the first display area of the display means is added or changed on the basis of the attribute of one selected, using the operating means, from the plurality of sample objects being displayed and having the different attributes.

These objects and other objects, features and advantages of the present invention will become more apparent from the following detailed description of the preferred embodiments of the present invention when taken in conjunction with the accompanying drawings.

DETAILED DESCRIPTION OF THE PREFERRED EMBODIMENTS

The present invention will be described in detail herebelow concerning embodiments of the information processing apparatus and method, and information processing program.

Figure 1:
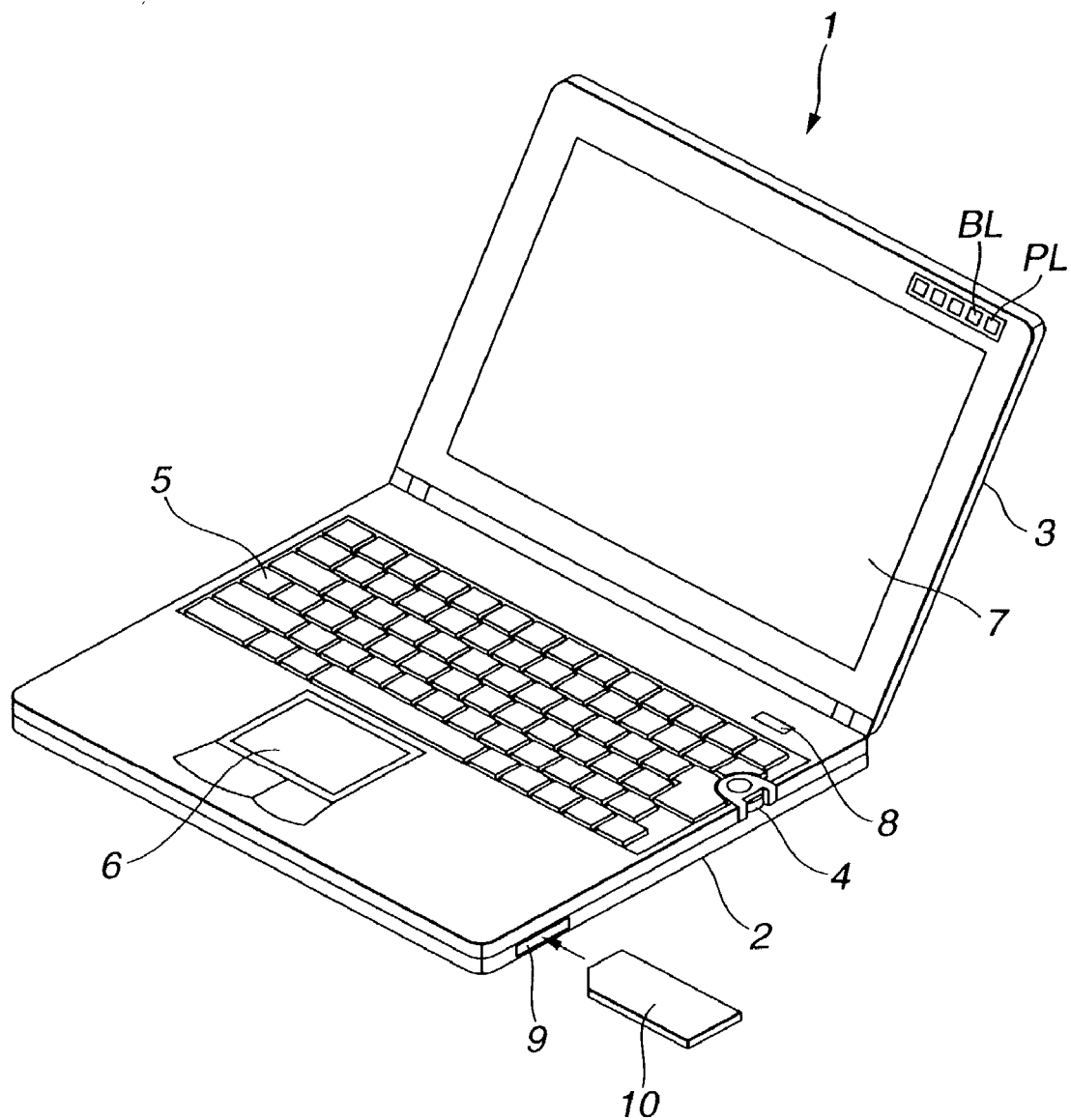
FIG. 1 shows the appearance of a notebook-sized personal computer (will be referred to as "notebook PC" hereunder) as an example to which the present invention is applied.

Referring now to FIG. 1, there is schematically shown in the form of a perspective view the appearance of a notebook-sized personal computer (will be referred to as "notebook PC" hereunder) as an example in which the information processor according to the present invention is adopted. The notebook PC is generally indicated with a reference 1. As shown, the basic components of the notebook PC 1 are a body unit 2, and a display unit 3 freely openable and closable in relation to the body unit 2. FIG. 1 shows the notebook PC 1 with the display unit 3 opened from the body unit 2.

The body unit 2 has provided on the top thereof a keyboard 5 used by the user for entry of various characters and symbols, a touch pad as a pointing device to control the pointer on the display screen, and a power switch 8. The touch pad 6 is used by the user to move the pointer to a desired position on the display screen. To operate the touch pad 6, the user touches a pad portion of the touch pad 6 and moves the finger thereon. When the pointer is moved to that position, the user clicks one of button portions of the touch pad 6. A command can thus be supplied to the notebook PC 1. It should be noted that in many cases, a so-called mouse (not shown) is also used as a pointing device. The mouse can move the pointer similarly to the touch pad 6. Also, a so-called wheel button may be used with the notebook PC 1.

Further, there is located at the upper right of the keyboard 5 of the body unit 2 a so-called jog dial 4 which is rotated and pressed to select a variety of information and make a decision. The dial portion is exposed at the right side of the body unit 2 as shown. Also, memory card slot 9, PC card slot (not shown), etc. are provided at the right side, for example, of the body unit 2. The memory card slot 9 receives a memory card 10 such as a memory stick (trademark), for example, incorporating a semiconductor memory such as a flash memory to record a still picture, moving picture, sound, text data, program, etc.

In front of the display unit 3, there is provided a liquid crystal display (LCD) 7 to display a picture thereon. Further, the display unit 3 has provided at the upper right thereof a pilot lamp PL, battery residual-potential lamp BL, and a message lamp and other LEDs as necessary.

The notebook PC 1 can acquire still or moving pictures taken using a digital still camera or digital video camera via the memory card 10.

The notebook PC 1 is designed to execute a picture viewer application software to arrange and display still pictures acquired into a hard disc.

Note that the notebook PC 1 accesses the picture viewer application software etc. from a program storage medium such as a CD-ROM (compact disc-read-only memory), hard disc or the like (not shown), loads them into a RAM (random access memory) and executes the software by means of a CPU (central processing unit).

Figure 2:
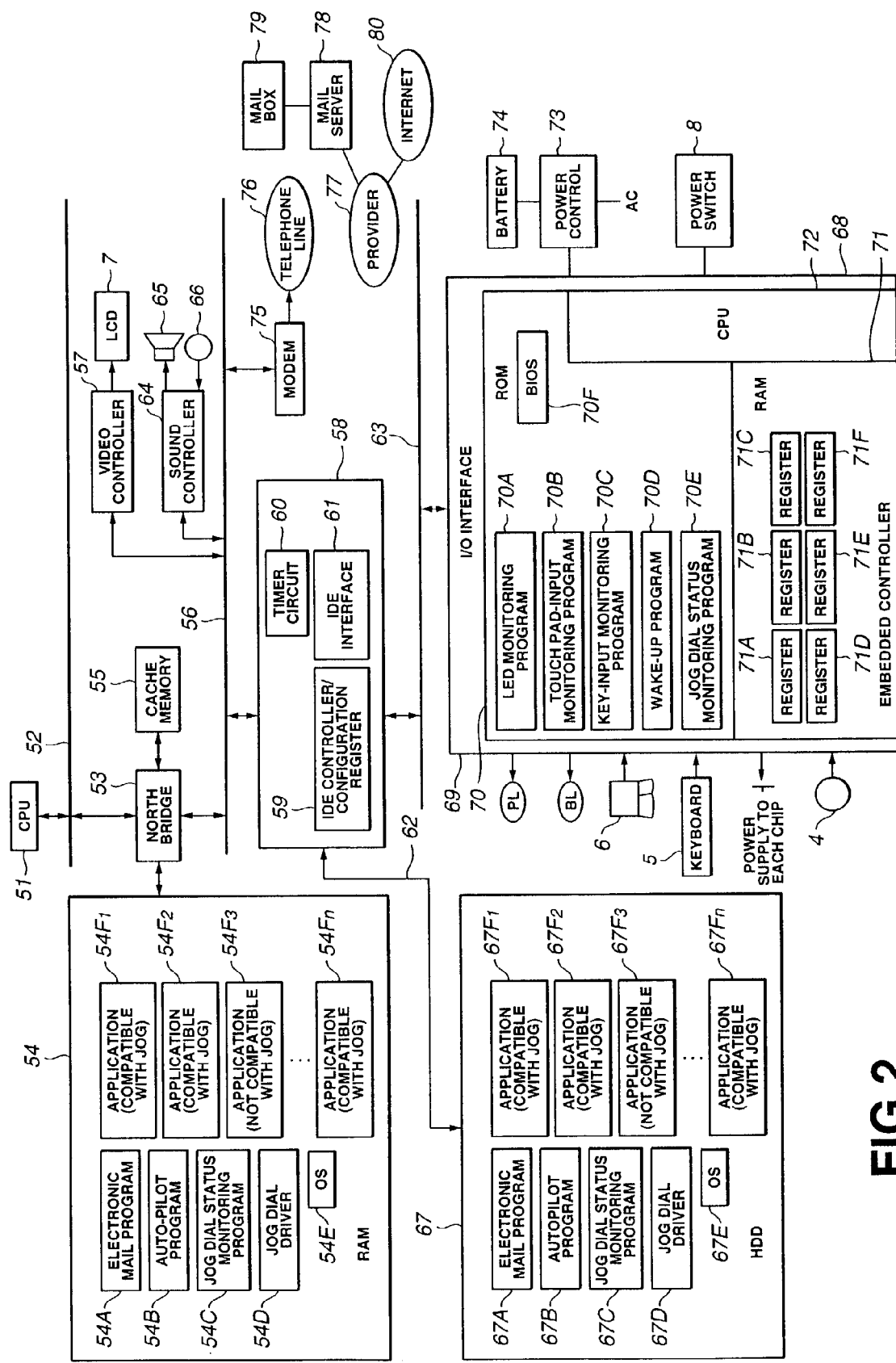
FIG. 2 is a block diagram explaining the configuration of the notebook PC in FIG. 1.

Next, an example of electrical system of the notebook PC 1 will be described with reference to the block diagram in FIG. 2. The CPU 51 is a Pentium (registered trademark) processor (by Intel), for example, and connected to a host bus 52 to which a north bridge 53 is connected. The north bridge 53 is also connected to a PC 1 bus 56. The north bridge 53 is formed from 400BX (by Intel) or the like to control the CPU 51, main memory 54 and its peripherals. It should be noted that the north bridge 53 and a south bridge 58 which will be described in detail later form together a chip set.

The north bridge 53 is connected to the main memory 54 and a cache memory 55 as well. The cache memory 55 caches data to be used by the CPU 51. It should be noted that the CPU 51 also incorporates a primary cache memory (not shown).

The main memory 54 is formed from a DRAM (dynamic random-access memory) for example to store a program to be executed by the CPU 51 and data necessary for operation of the CPU 51. More particularly, when the notebook PC 1 is started, the main memory 54 receives and stores an electronic mail program 54A, auto-pilot program 54B, jog dial status monitoring program 54C, jog dial driver 54D, operating system (OS) program 54E and other application programs $54F_1$, to $54F_n$ transferred from a hard disc built in a hard disc drive (HDD) 67. In the following description, the aforementioned picture viewer application software will be taken as the application program $54F_1$.

The electronic mail program 54A is used to transfer a message through a network from a communication line such as a telephone line 76 via a modem 75 which will be described in detail later. Also, the electronic mail program 54A has a special function to acquire an incoming mail. The incoming mail acquisition function is provided to check a mail server 78 included in a provider 77 for arrival of a mail addressed to the user at a mail box 79 in the mail server 78, and acquire such a user-addressed mail, if any.

The auto-pilot program 54B is used to start multiple preset kinds of processing (or programs) etc. in a predetermined sequence.

The jog dial status monitoring program 54C is intended to receive, from the application programs $54F_1$, to $54F_n$, notices of whether the application programs $54F_1$ to $54F_n$ are compatible with the jog dial, and display what can be done by operating the jog dial 4 when the application programs are compatible, for example. Normally, the status monitoring program 54C for the jog dial 4 waits for an event made on the jog dial 4, and also has a list according to which notices are received from the application programs $54F_1$ to $54F_n$. Also, the jog dial driver 54D performs each of its functions correspondingly to an operation of the jog dial 4.

The OS program (operating system software) 54E is used to control the computer's basic operations such as represented by the so-called Windows 95 and 98 (both are trademarks) of the Microsoft, Mac OS (trademark) of the Apple Computers, etc.

Examples of the picture viewer application software referred to herein as the application program $54F_1$ include an electronic photo album software. The electronic photo album software arranges picture files acquired from the digital still camera or the like for viewing by the user as if he or she viewed an ordinary photo album. Also, the electronic photo album software can add an object such as a character, figure or the like to a display area where a picture is being displayed, change the attributes of the objects, make simple correction and picture processing of a target picture.

A video controller 57 is also provided and connected to the PCI bus 56, and controls the display on the LCD 7 of the display unit 3 according to data supplied via the PCI bus 56.

The PCI bus 56 has connected thereto a sound controller 64 to acquire an input from a microphone 66 or supply a sound signal to a speaker 65. Also, the modem 75 is connected to the PCI bus 56. The modem 75 can be connected to a communication network 80 such as the Internet, mail server 78 and the like via a public telephone line 76 or Internet service provider 77.

Further, the PCI bus 56 has the south bright 58 connected thereto. The south bridge 58 is formed from PIIx4E (by Intel), for example, to control a variety of inputs/outputs (I/O). More specifically, the south bridge 58 is formed from an IDE (integrated drive electronics) controller/configuration register 59, timer circuit 60, IDE interface 61, etc. to control a device connected to an IDE bus 62, and a device connected via an ISA/EIO (industry standard architecture/extended input output) bus 63 and embedded controller 68.

The IDE controller/configuration register 59 is formed from two IDE controllers including a so-called primary IDE controller and secondary IDE controller, configuration register, etc. (not shown).

The primary IDE controller is connected to a connector (not shown) via the IDE bus 62, and the HDD 67 is connected to the connector. The secondary IDE controller is designed such that when a bay device as an IDE device like a CD-ROM drive, second HDD or FDD (floppy disc (registered trademark) drive) (not shown) is attached to the notebook PC 1, the connector of the bay device will electrically be connected to the secondary IDE controller via another IDE bus.

Note that the hard disc in the HDD 67 has previously stored therein an electronic mail program 67A, auto-pilot program 67B, jog dial status monitoring program 67C, jog dial driver 67D, OS program 67E and other application programs $67F_1$ to $67F_n$. The application program $67F_1$, is a picture viewer application software like the electronic photo album software. Therefore, the hard disc used in the HDD 67 serves as a program storage medium to store the information processing program according to the present invention.

The programs 67A, 67B, 67C, 67D, 67E and $67F_1$ to $67F_n$ stored in the hard disc of the HDD 67 are transferred one after another to the RAM (main memory) 54 in the process of bootstrapping, and they will temporarily be stored as the electronic mail program 54A, auto-pilot program 54B, jog dial status monitoring program 54C, jog dial driver 54D, OS program 54E and other application programs $54F_1$, to $54F_n$, respectively.

The ISA/EIO bus 63 has the embedded controller 68 connected thereto. The embedded controller 68 is formed from a micro controller and used as an I/O controller. That is, the embedded controller 68 is composed of an I/O interface 69, ROM 70, RAM 71 and CPU 72 interconnected to each other.

The ROM 70 has previously stored therein an LED control program 70A, touch-pad input monitoring program 70B, key-input monitoring program 70C, wake-up program 70D and a jog dial status monitoring program 70E.

The LED control program 70A controls the power pilot lamp PL, battery residual-potential lamp BL, message lamp and other LEDs as necessary to turn on and off. The touch-pad input monitoring program 70B monitors whether an input is supplied from the user operating the touch pad 6. The key-input monitoring program 70C monitors whether an input is supplied from the user operating the keyboard 5 or any other key switch. The wake-up program 70D checks whether a preset time is reached, based on current time data supplied from the timer circuit 60 included in the south bridge 58, and manages the power supply to each chip for starting a predetermined processing (or program) when the preset time is reached. The jog dial status monitoring program 70E monitors whether the dial of the jog dial 4 has been rotated or pressed.

The ROM 70 has further a basic input/output system (BIOS) 70F stored therein. The "BIOS" refers to a basic input/output system, and is a software program to control data transfer (input/output) between the OS or application software and the peripheral device (LCD 7, keyboard 5, HDD 67 or the like).

The RAM 71 has an LED control register, touch-pad input status register, key-input status register, set-time register, and a jog dial status monitoring I/O register as registers 71A to 71F. For example, the LED control register 71A turns on the message lamp indicating an instantaneous start-up of the mail when the jog dial 4 is pressed. The key-input status register 71C stores an operation-key flag when the jog dial 4 is pressed for a one-touch operation which will be described in detail later. The set-time register 71D can freely set a time.

Also, the embedded controller 68 has connected thereto the jog dial 4, touch pad 6 and keyboard 5 via connectors (not shown), respectively, and provides the ISA/EIO bus 63 with a signal corresponding to the operation of each of the jog dial 4, touch pad 6 and keyboard 5. The embedded controller 68 has also the power pilot lamp PL, battery residual-potential lamp BL, message lamp and other LEDs connected thereto.

To the embedded controller 68, there is connected a power control circuit 73 connected to a built-in battery 74 or AC source. The power control circuit 73 supplies a necessary power to each of the blocks and controls the built-in battery 74 and secondary battery of the peripheral device for charging of them. Further, the embedded controller 68 monitors the power switch 8 which is operated for connection or disconnection of the power supply.

Figure 3:
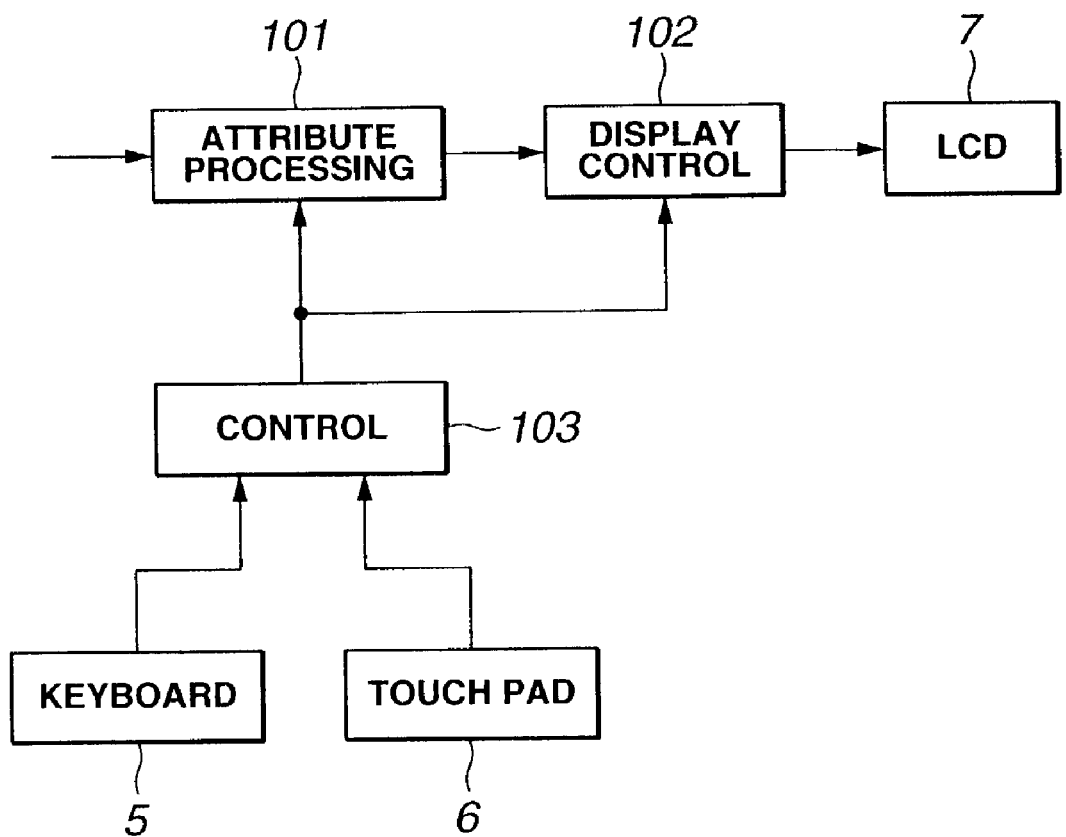
FIG. 3 is a block diagram explaining the functions of a CPU included in the notebook PC.

Note that the CPU 51 included in the notebook PC 1 may be regarded as having a attribute processor 101, display control unit 102 and a controller 103 as functional blocks, respectively, as shown in FIG. 3 in a mode for addition or change of an object such as a character, figure or the like by the electronic photo album software read in the application program 54F₁ in the RAM 54.

Note that the mode for addition or change of an object is done when an edit icon on the LCD 7 is selected by operating the touch pad 6, which will be described in detail later with reference to the display screens shown in FIGS. 4 to 16. It should be noted that in this embodiment, the means for selecting the edit icon is the touch pad 6 but it may of course may be the aforementioned mouse, draw tablet, cursor key or the like.

Note that in this embodiment, objects to be added to the display area where a picture is displayed or those displayed in the display area and which are to be changed include a line, character, figure, illustration and lettered stamp as examples.

As shown in FIG. 3, the attribute processor 101 processes a plurality of attributes of the sample object, and outputs them to the display control unit 102. Also, the attribute processor 101 applies the sample-object attribute selected using the touch pad 6 to the object. The attribute processor 101 generates a sample object having a new attribute on the basis of a parameter related to the attribute selected using the touch pad 6.

The display control unit 102 displays a plurality of sample objects supplied from the attribute processor 101 and different in attribute from each other in the descending order starting with the most frequently used one in the form of a list in the display area on the LCD 7. The display control unit 102 adds a sample object having a new attribute, generated by the attribute processor 101 to the list. It should be noted that when all the sample objects cannot be displayed in the display area at the same time, the display control unit 102 displays the yet-to-be-displayed sample objects one after another as the scroll bar is moved by operating the touch pad 6.

The controller 103 provides such a control as to detect the attribute of one selected, using the touch pad 6, from the sample objects being displayed in the display area on the LCD 7, and apply the attribute also to the object supplied to the attribute processor 101. Also, when the object is a character, the controller 103 controls the attribute processor 101 to add the character entered from keyboard 5 on the basis of the sample-object attribute selected using the touch pad 6. When the object is a line, the controller 103 will control the attribute processor 101 to add the line to along the trajectory of the touch pad 6 on the basis of the sample-object attribute selected using the touch pad 6.

Figure 4:
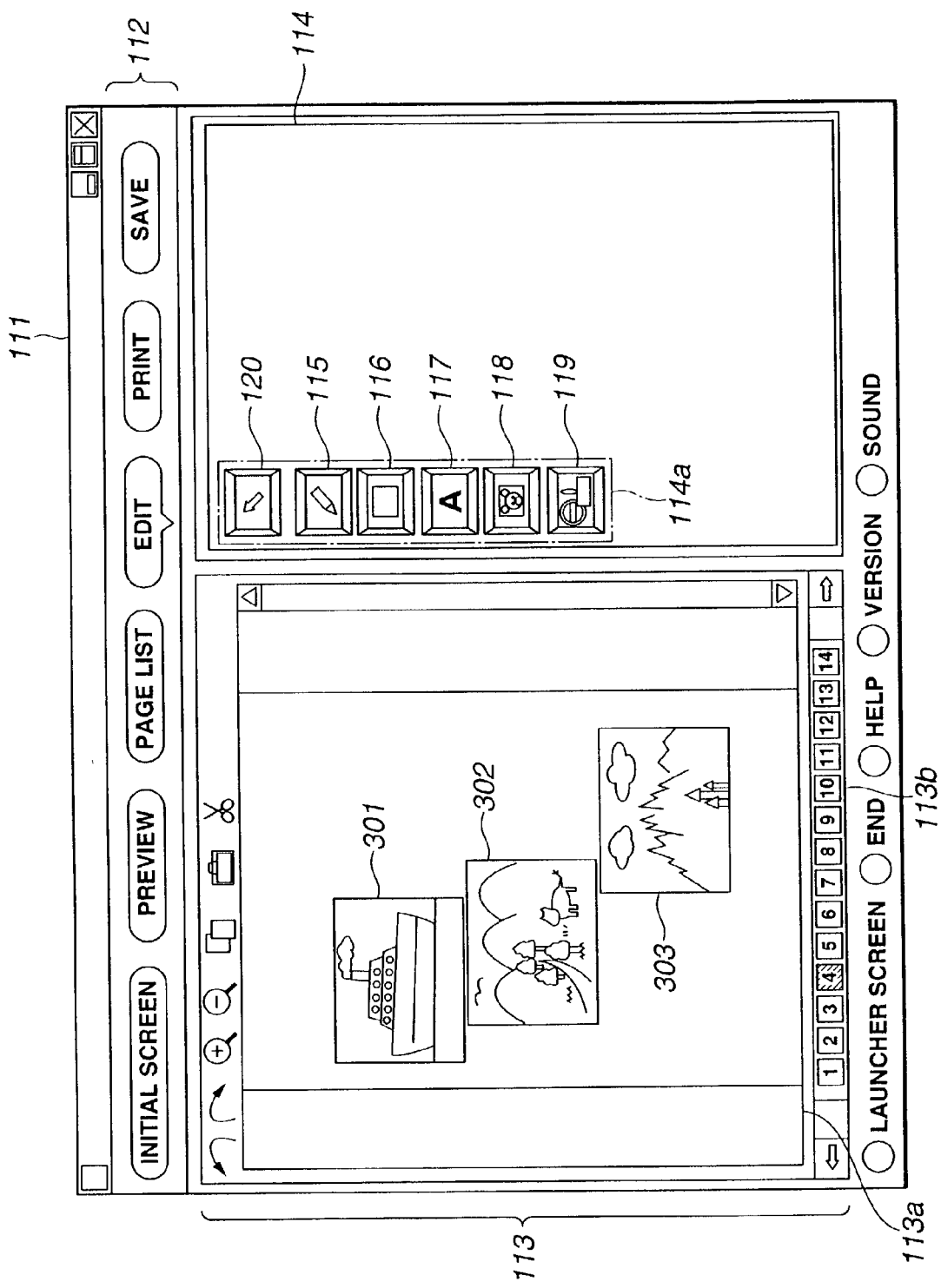
FIG. 4 shows an edit menu appearing when the notebook PC executes an electronic photo album software.
Figure 12:
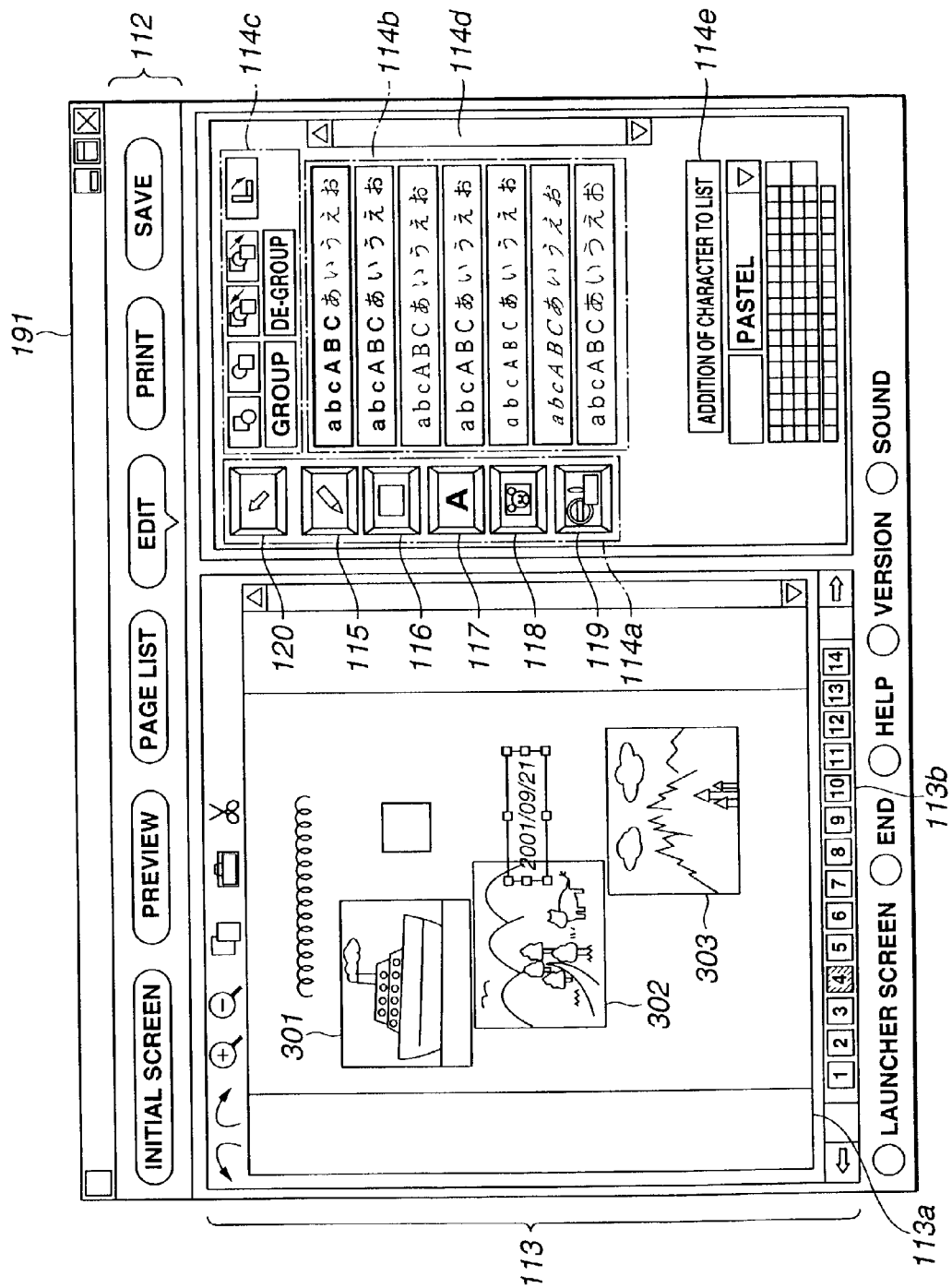
FIG. 12 shows an on-screen display PC at the time of changing the attribute of a character when the notebook PC executes the electronic photo album software.
Figure 13:
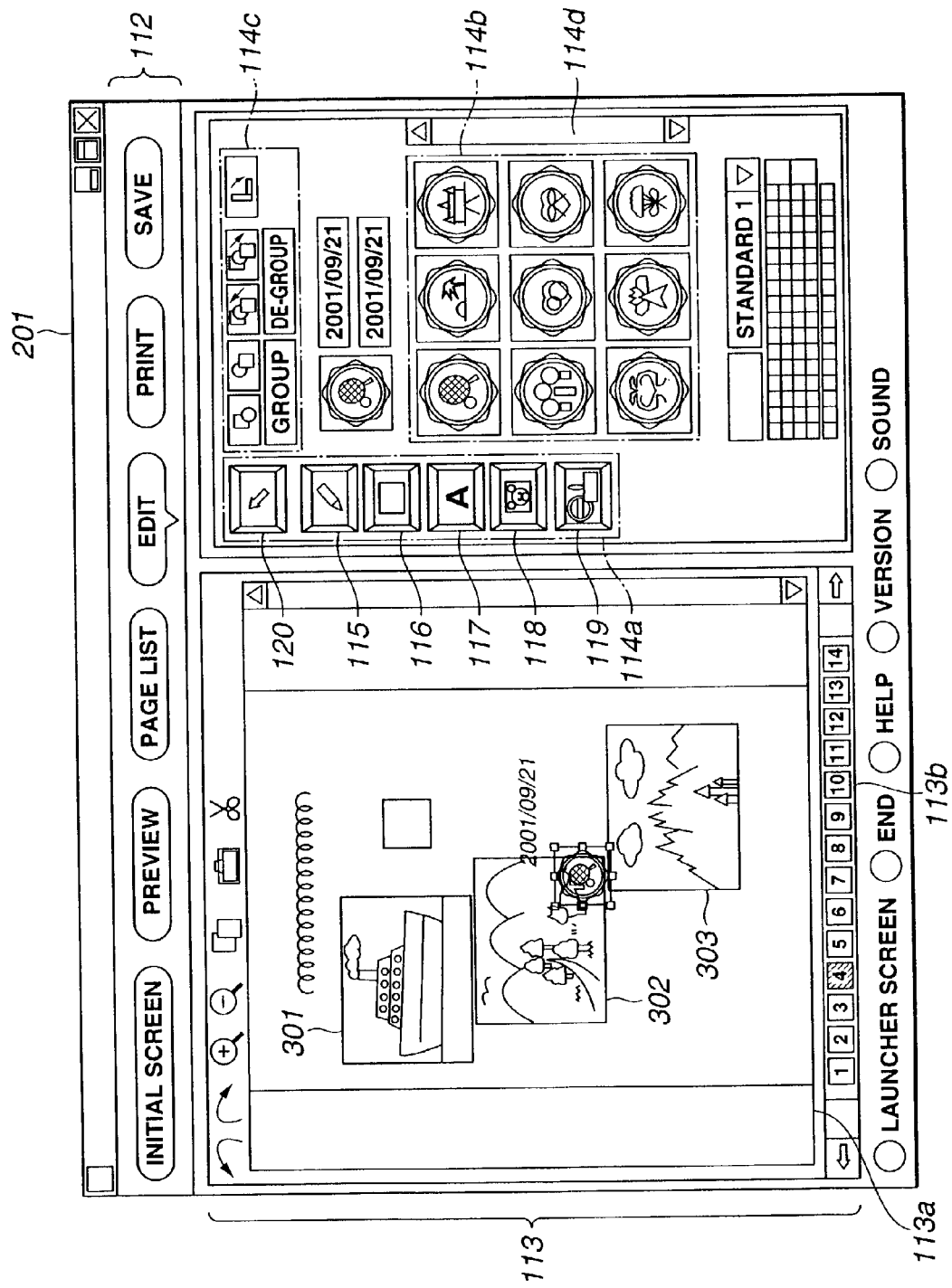
FIG. 13 shows an on-screen display PC at the time of changing the attribute of a stamp when the notebook PC executes the electronic photo album software.
Figure 14:
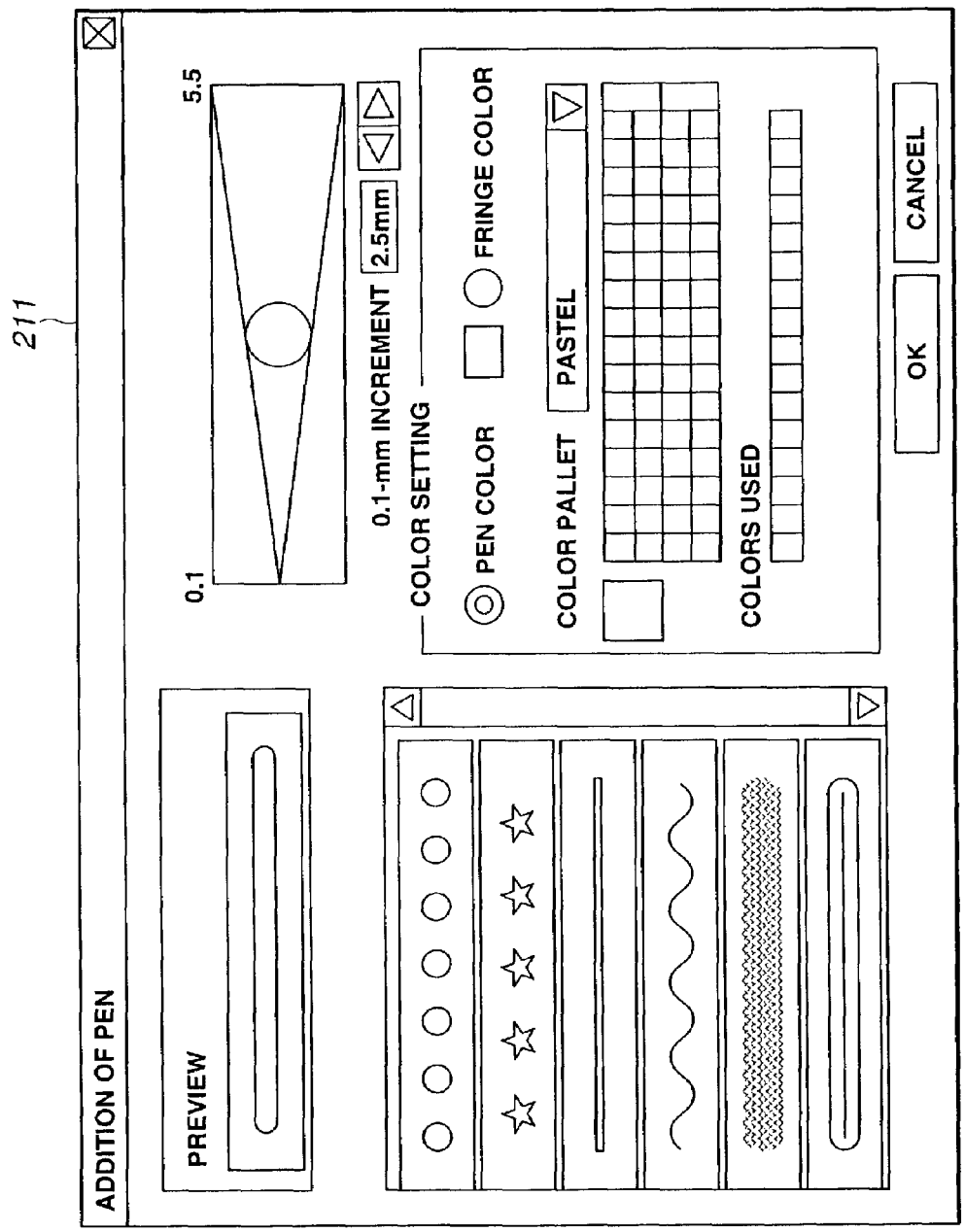
FIG. 14 shows an on-screen display PC at the time of generating a new line attribute when the notebook PC executes the electronic photo album software.
Figure 15:
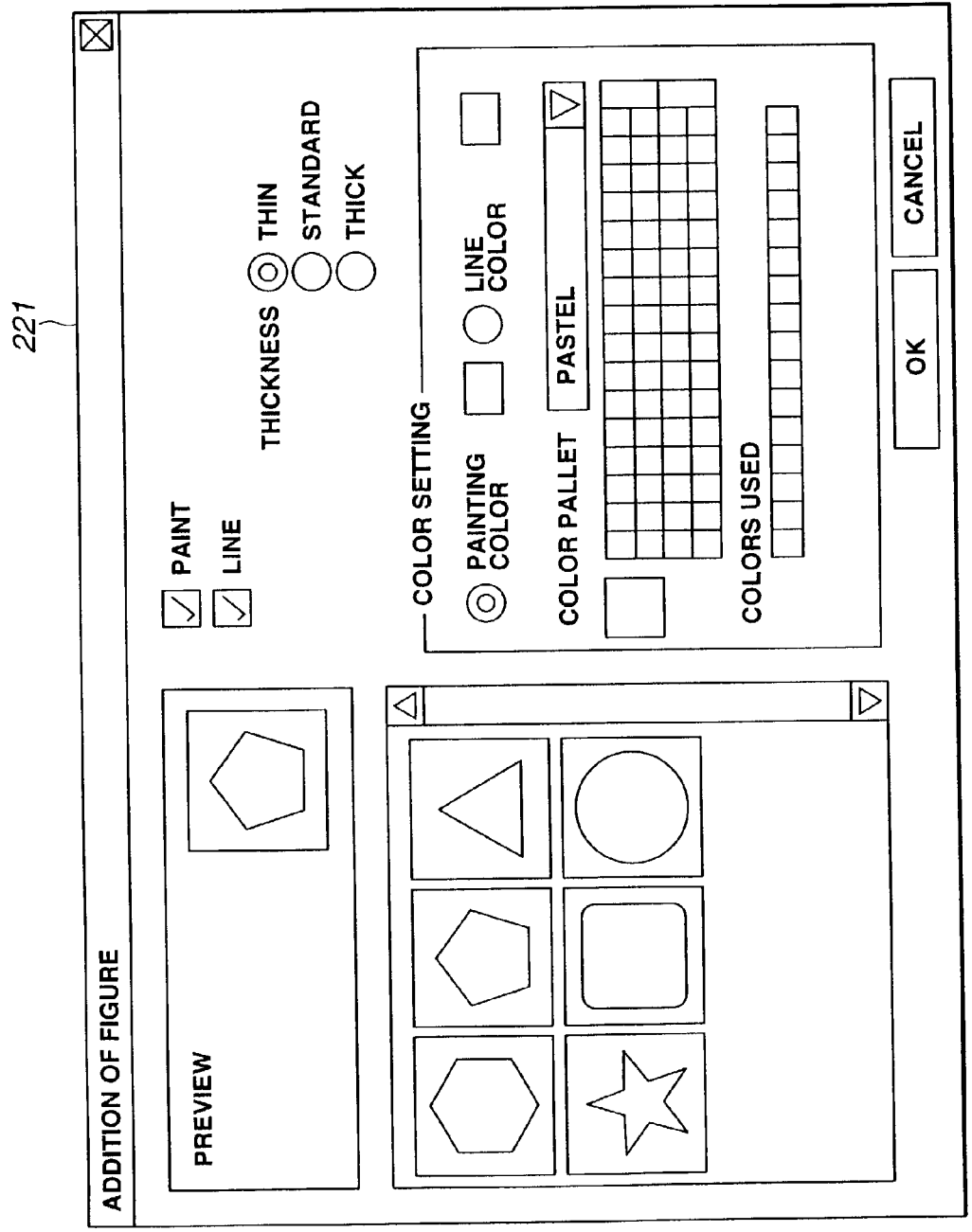
FIG. 15 shows an on-screen display PC at the time of generating a new figure attribute when the notebook PC executes the electronic photo album software.
Figure 16:
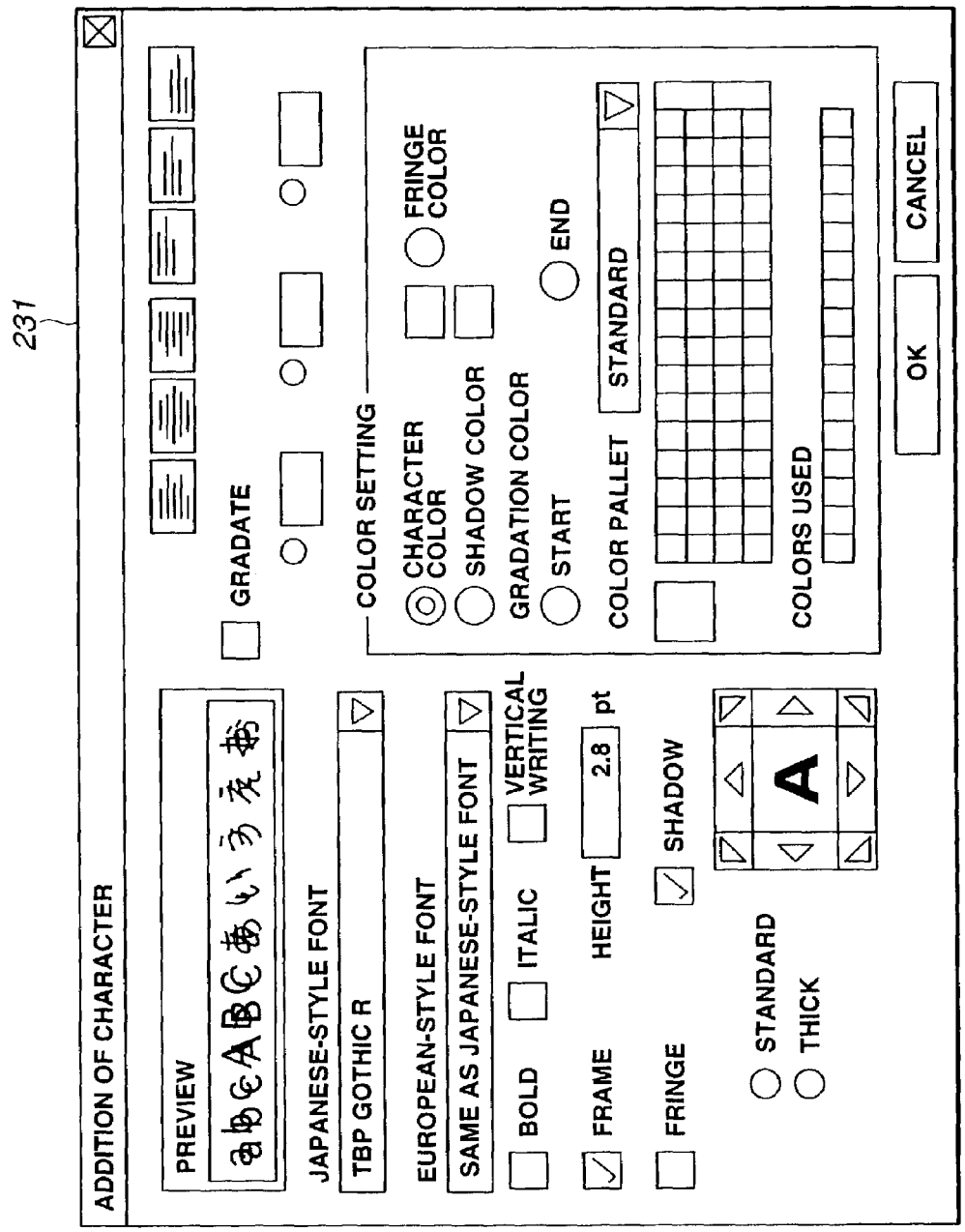
FIG. 16 shows an on-screen display PC at the time of generating a new character attribute when the notebook PC executes the electronic photo album software.

Next, concrete examples of display screens on the LCD 7 when the notebook PC 1 is executing the electronic photo album software will be described with reference to FIGS. 4 to 16. FIG. 4 shows an on-screen display of an edit menu. FIGS. 5 to 9 show an on-screen display appearing when an object is added. FIGS. 10 to 13 show on-screen displays appearing when the attribute of an object is changed. FIGS. 14 to 16 shows on-screen displays appearing when a new attribute is generated.

FIG. 4 shows a photo album window 111 appearing when the edit menu of the electronic photo album software is executed. The photo album window 111 consists of a menu select section 112 and picture display sections 113 and 114.

The menu select section 112 shows a menu executable by the electronic photo album software. An item can be selected from the menu by the use of the touch pad 6.

The picture display section 113 includes mainly a picture display area 113a equivalent to one page of the album and where at least a picture is displayed, and a page number display area 113b where a page number for the picture display area 113a is displayed. When a predetermined picture in the picture display area 113a is selected by operating the touch pad 6, the mode of operation shifts to a one for subjecting the selected picture, namely, a target picture, to various kinds of picture processing. Also, when a predetermined page number in the page number display area 113b is selected by operating the touch pad 6, a picture in the picture display area 113a equivalent to the selected page number is displayed.

The picture display section 114 includes an edit mode select area 114a in which edit icons 115 to 120 used for various kinds of editing of pictures in at least the picture display area 113a are displayed.

Figure 5:
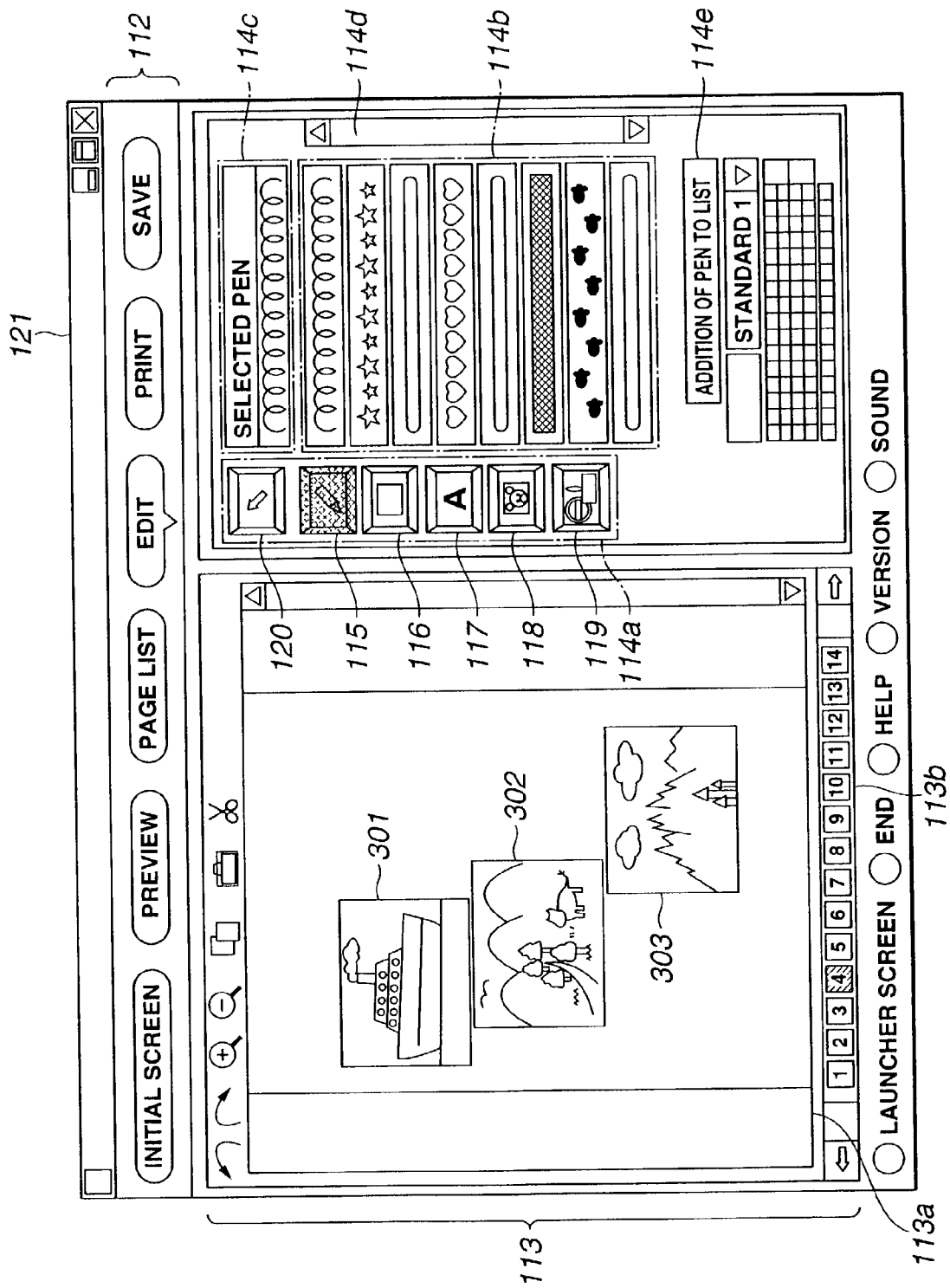
FIG. 5 shows an on-screen display appearing at the time of adding a line when the notebook PC executes the electronic photo album software.

When the edit icon 115 is selected using the touch pad 6, the on-screen display is switched to a photo album window 121 in FIG. 5 and the mode of operation shifts to a one for pen-writing addition, by a pan-shaped pointer (will be referred to simply as "pen" hereunder), of a line to the picture display area 113a.

Figure 6:
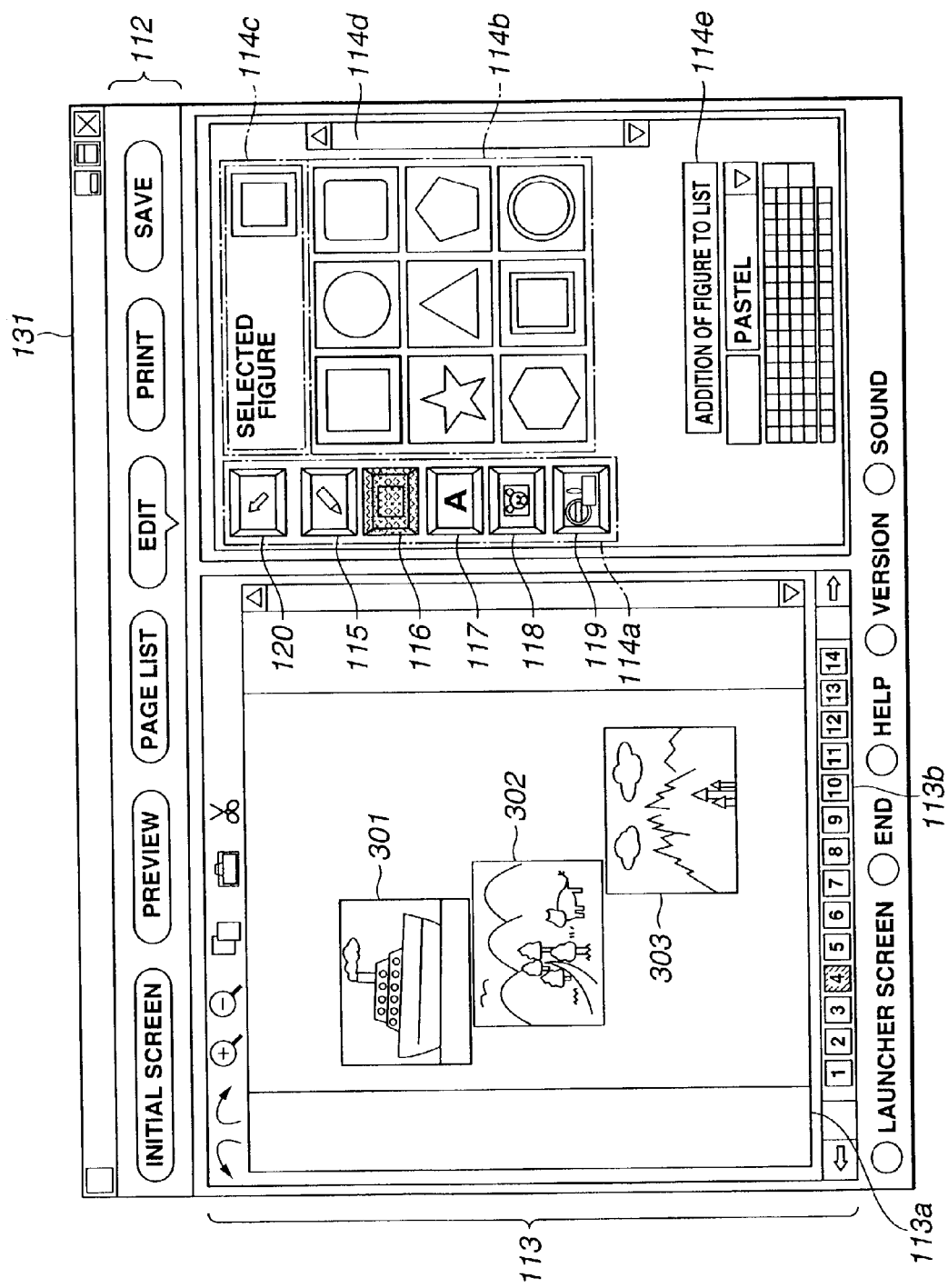
FIG. 6 shows an on-screen display PC at the time of adding a figure when the notebook PC executes the electronic photo album software.

When the edit icon 116 is selected using the touch pad 6, the on-screen display is switched to a photo album window 131 in FIG. 6 and the mode of operation shifts to a one for addition of a figure to the picture display area 113a.

Figure 7:
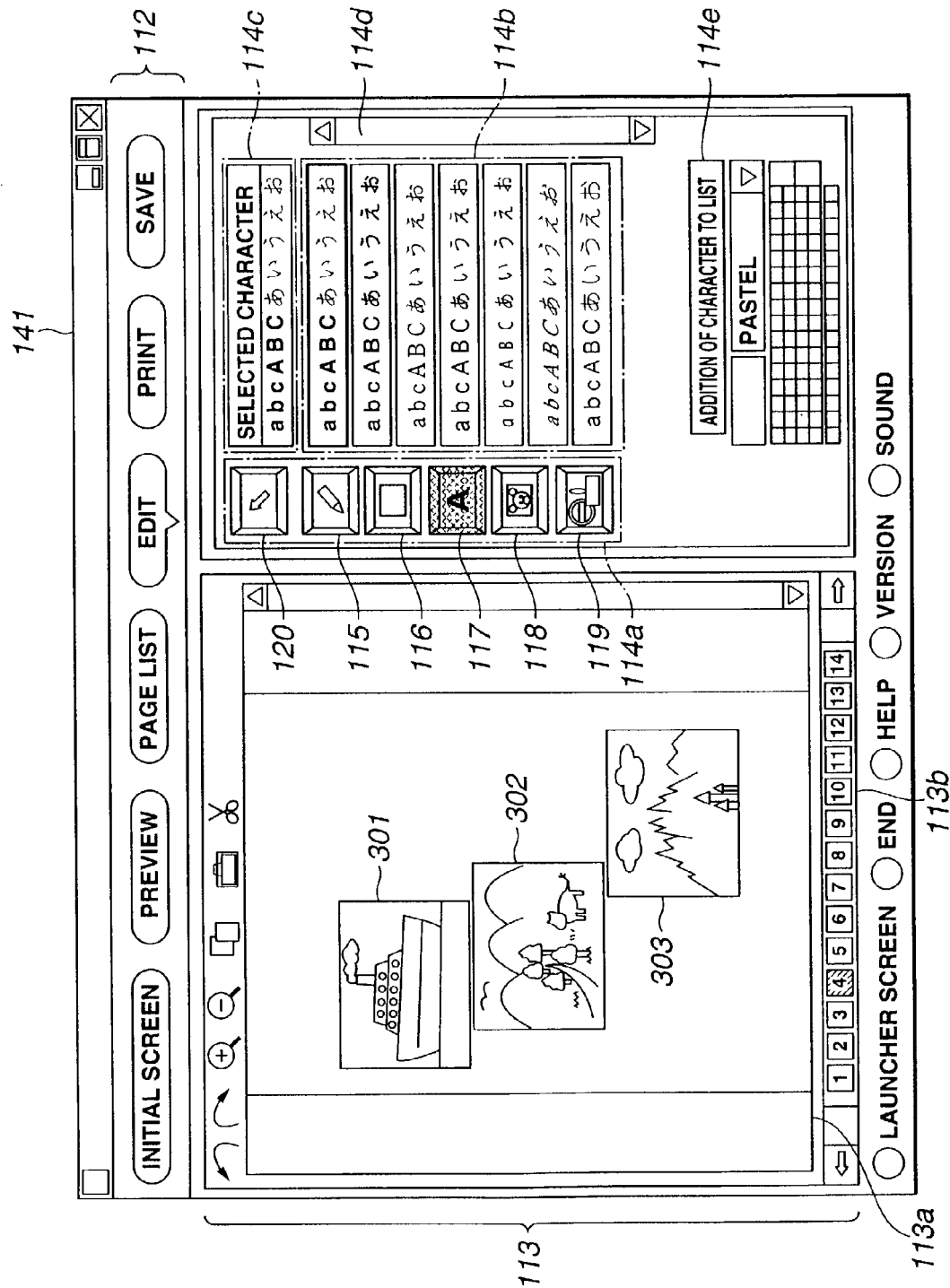
FIG. 7 shows an on-screen display PC at the time of adding a character when the notebook PC executes the electronic photo album software.

When the edit icon 117 is selected using the touch pad 6, the on-screen display is switched to a photo album window 141 in FIG. 7 and the mode of operation shifts to a one for addition of a character to the picture display area 113a.

Figure 8:
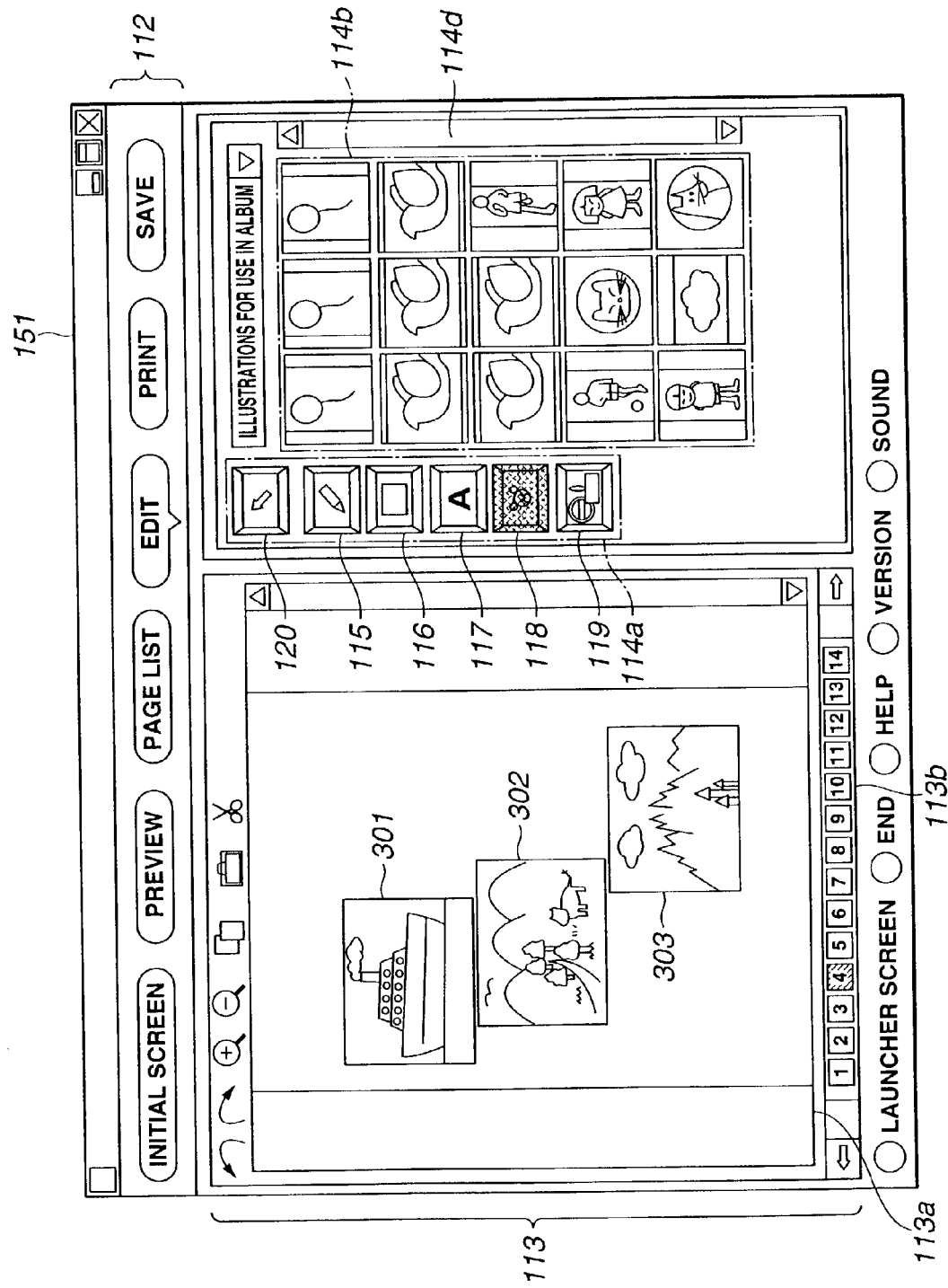
FIG. 8 shows an on-screen display PC at the time of adding an illustration when the notebook PC executes the electronic photo album software.

When the edit icon 118 is selected using the touch pad 6, the on-screen display is switched to a photo album window 151 in FIG. 8 and the mode of operation shifts to a one for addition of an illustration to the picture display area 113*a*.

Figure 9:
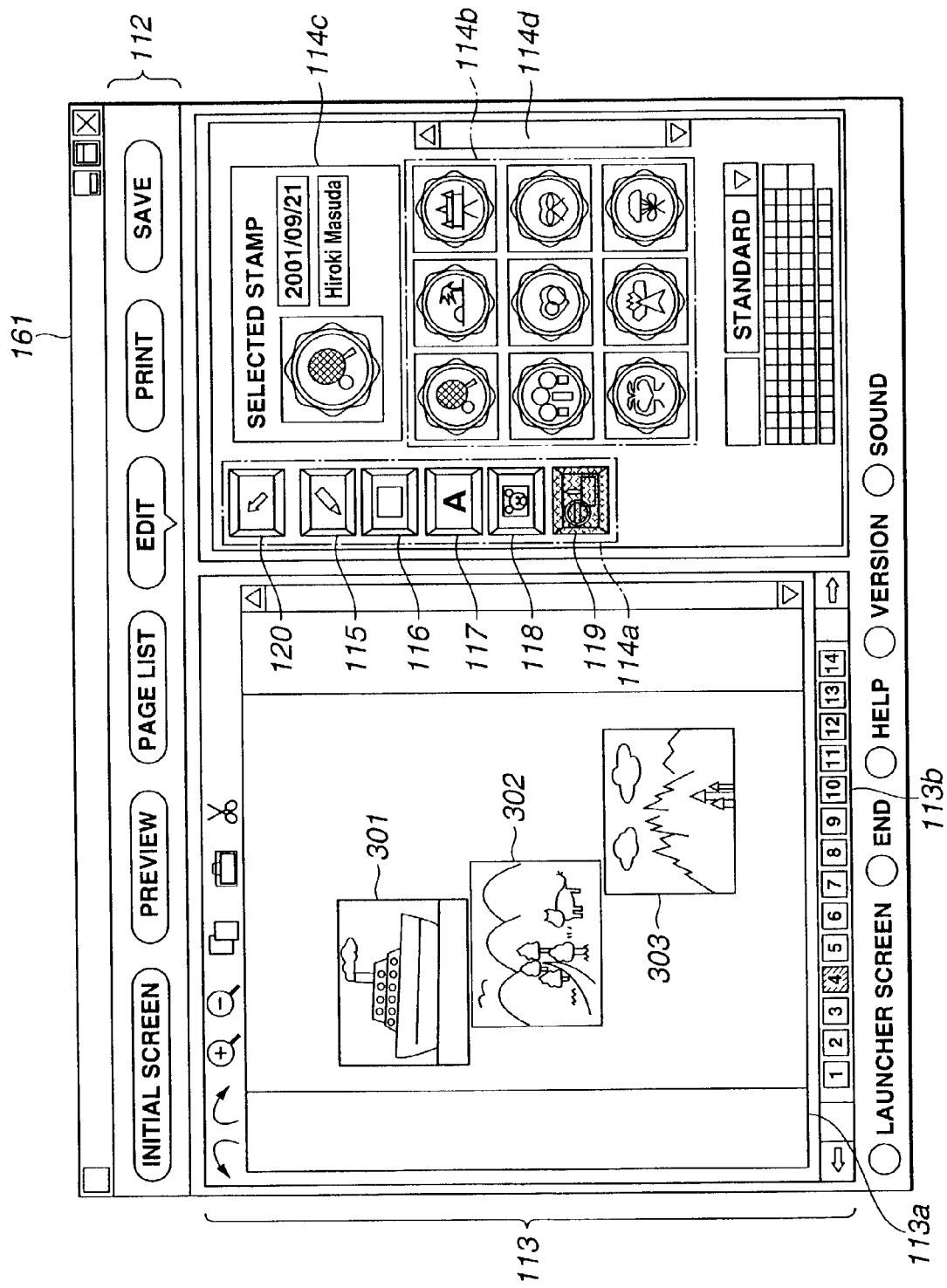
FIG. 9 shows an on-screen display PC at the time of adding a stamp when the notebook PC executes the electronic photo album software.

When the edit icon 119 is selected using the touch pad 6, the on-screen display is switched to a photo album window 161 in FIG. 9 and the mode of operation shifts to a one for addition of a stamp to the picture display area 113*a*.

The edit icon 120 is selected for terminating the additional insertion of a line or illustration by the pen-shaped pointer.

Note that in the photo album window 111 shown in FIG. 4, pictures 301 to 303 equivalent to the fourth page are displayed in the picture display area 113*a* of the picture display section 113. Since the pictures 301 to 303 equivalent to the fourth phase are displayed in the picture display area 113*a*, a portion "4" of the page number display area 113*b* of the picture display section 113 is changed in color. Also, only the edit icons 115 to 120 are displayed in the edit mode select area 114*a* of the picture display section 114.

The menu select section 112 and picture display sections 113 and 114 included in the photo album window 111 are used in common in the edit menu.

The photo album window 121 shown in FIG. 5 is an on-screen display for the pen-writing addition mode set when the edit icon 115 is selected, using the touch pad 6, in the photo album window 111 in FIG. 4.

The picture display section 114 of the photo album window 121 includes an edit mode select area 114*a*, sample object display area 114*b*, selected sample object display area 114*c*, scroll bar 114*d* and a sample object create icon 114*e*.

Since the photo album window 121 is an on-screen display for the pen-writing addition mode, a plurality of sample lines different in attribute from each other and sample lines having attributes uniquely generated are displayed as defaults in the form of a list in the sample object display area 114*b*.

Note that in the list, the sample lines are arranged in the descending order from the most frequently used one. That is, the sample lines are rearranged so that the latest attribute used just before is positioned at the topmost position in the order. It should also be noted that the largest number of sample lines whose attributes can be uniquely generated is fifteen and the sample lines are erased after elapse of a predetermined time period. Also, when sample lines all of which cannot be displayed at the same time exist in the sample object display area 114*b*, they will be displayed one after another as the scroll bar 114*d* is moved using the touch pad 6. The lists of sample figures, sample characters, sample illustrations and sample stamps, which will be described in detail later, are similar to the list of sample lines.

A sample line selected, using the touch pad 6, in the sample object display area 114*b* is displayed in the selected sample object display area 114*c*.

When a user-desired position is selected, using the touch pad 6, in the picture display area 113*a* after a sample line is selected, it becomes possible to actually add a line first at the selected position on the basis of the attribute of the selected sample line and the line will be written (added) as the pen is moved using the touch pad 6. When the edit icon 120 is selected, the line write by the pen will be terminated.

When the sample object create icon 114*e* is selected using the touch pad 6, the on-screen display will change to a photo album window 211 which will be described later with reference to FIG. 14 and also the mode of operation will shift to a mode for creation of a sample line having a user-desired attribute.

The photo album window 131 shown in FIG. 6 is an on-screen display for the figure addition mode established when the edit icon 116 is selected, using the touch pad 6, in the photo album window 111 in FIG. 4.

The picture display section 114 of the photo album window 131 includes an edit mode select area 114*a*, sample object display area 114*b*, selected sample object display area 114*c*, scroll bar 114*d* and a sample object create icon 114*e*.

Since the photo album window 131 is an on-screen display for the figure addition mode, a plurality of sample figures different in attribute from each other and sample figures having attributes uniquely generated are displayed as defaults in the form of a list in the sample object display area 114*b*.

A sample figure selected, using the touch pad 6, in the sample object display area 114*b* is displayed in the selected sample object display area 114*c*.

When a user-desired position is selected, using the touch pad 6, in the picture display area 113*a* after a sample figure is selected, it becomes possible to actually add a figure at the selected position on the basis of the attribute of the selected sample figure.

When the sample object create icon 114*e* is selected using the touch pad 6, the on-screen display will change to a photo album window 221 which will be described later with reference to FIG. 15 and also the mode of operation will shift to a mode for creation of a sample figure having a user-desired attribute.

The photo album window 141 shown in FIG. 7 is an on-screen display for the character addition mode established when the edit icon 117 is selected, using the touch pad 6, in the photo album window 111 in FIG. 4.

The picture display section 114 of the photo album window 141 includes an edit mode select area 114*a*, sample object display area 114*b*, selected sample object display area 114*c*, scroll bar 114d and a sample object create icon 114*e*.

Since the photo album window 141 is an on-screen display for the character addition mode, a plurality of sample characters different in attribute from each other and sample characters having attributes uniquely generated are displayed as defaults in the form of a list in the sample object display area 114*b*.

A sample character selected, using the touch pad 6, in the sample object display area 114*b* is displayed in the selected sample object display area 114*c*.

When a user-desired position is selected, using the touch pad 6, in the picture display area 113*a* after a sample character is selected, it becomes possible to actually add a character first at the selected position on the basis of the attribute of the selected sample character and the character will be added from the keyboard 5.

When the sample object create icon 114*e* is selected using the touch pad 6, the on-screen display will change to a photo album window 231 which will be described later with reference to FIG. 16 and also the mode of operation will shift to a mode for creation of a sample character having a user-desired attribute.

The photo album window 151 shown in FIG. 8 is an on-screen display for the illustration addition mode established when the edit icon 118 is selected, using the touch pad 6, in the photo album window 111 in FIG. 4.

The picture display section 114 of the photo album window 151 includes an edit mode select area 114*a*, sample object display area 114*b* and a scroll bar 114*d*.

Since the photo album window 151 is an on-screen display for the illustration addition mode, sample illustrations having attributes uniquely generated are displayed as defaults in the form of a list in the sample object display area 114*b*.

When a sample illustration is selected, an illustration is actually added to the picture display area 113a. Then, selection of the edit icon 120 will terminate the illustration addition.

The photo album window 161 shown in FIG. 9 is an on-screen display for the stamp addition mode established when the edit icon 119 is selected, using the touch pad 6, in the photo album window 111 in FIG. 4.

The picture display section 114 of the photo album window 161 includes an edit mode select area 114a, sample object display area 114b, selected sample object display area 114c and a scroll bar 114d.

Since the photo album window 161 is an on-screen display for the stamp addition mode, sample stamps having attributes uniquely generated are displayed as defaults in the form of a list in the sample object display area 114b.

A sample stamp selected, using the touch pad 6, in the sample object display area 114b is displayed in the selected sample object display area 114c.

When a user-desired position is selected, using the touch pad 6, in the picture display area 113a after a sample stamp is selected, it becomes possible to actually add a stamp at the selected position on the basis of the attribute of the selected sample stamp.

Figure 10:
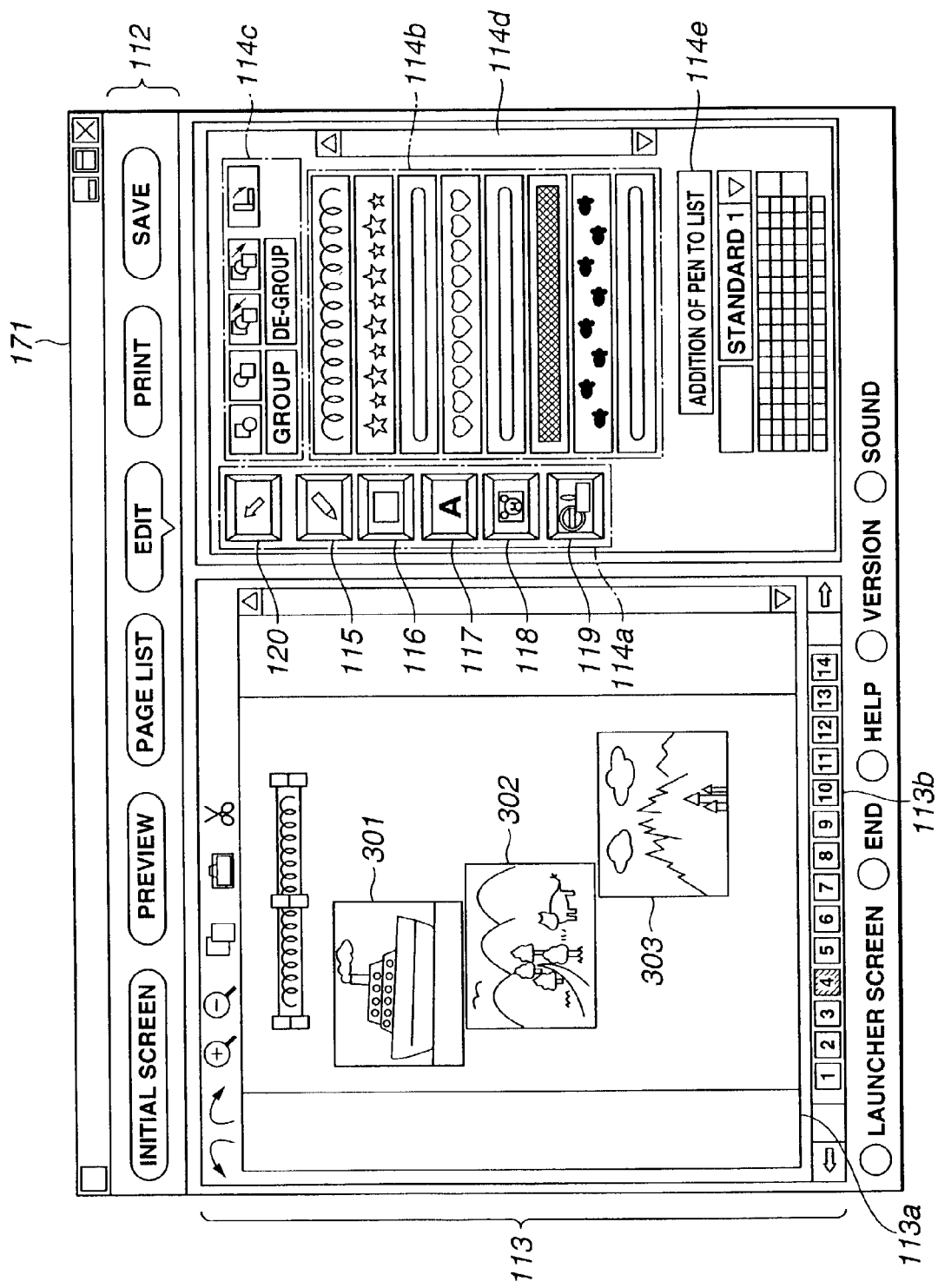
FIG. 10 shows an on-screen display PC at the time of changing the attribute of a line when the notebook PC executes the electronic photo album software.

A photo album window 171 shown in FIG. 10 is an on-screen display when a line added in the picture display area 113a is selected using the touch pad 6.

In the photo album window 171, the line selected in the picture display area 113a is so-called "active".

The picture display area 114 includes an edit mode select area 114a, sample object display area 114b, selected sample object display area 114c, scroll bar 114d, and a sample object create icon 114e.

In the selected sample object display area 114c, there are newly displayed an icon used to change a position where a picture and an object overlap each other, an icon used to rotate an object, an icon for grouping and de-grouping a plurality of objects, etc.

When a sample line is selected, using the touch pad 6, in the sample object display area 114b, the "active" line is changed to have the attribute of the selected sample line. Also, when an icon is selected, using the touch pad 6, in the selected sample object display area 114c, the "active" line is processed accordingly. The "active" line is erasable by a delete operation at the keyboard 5.

Figure 11:
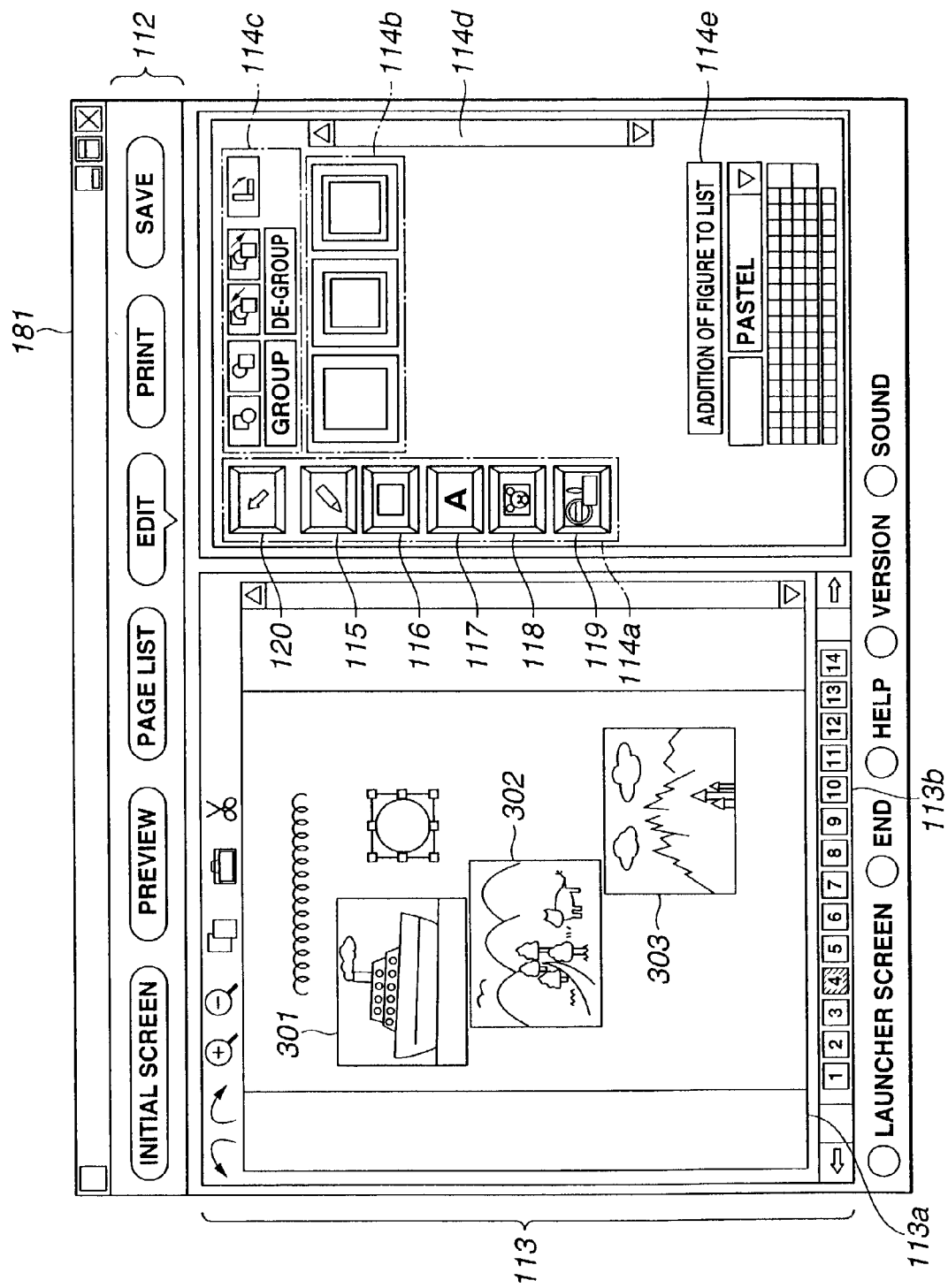
FIG. 11 shows an on-screen display PC at the time of changing the attribute of a figure when the notebook PC executes the electronic photo album software.

In the photo album window 171 shown in FIG. 10, the target object is a line. FIG. 11 shows a photo album window 181 which is an on-screen display appearing when the target object is a figure. FIG. 12 shows a photo album window 191 which is an on-screen display appearing when the target object is a character. FIG. 13 shows a photo album window 201 which is an on-screen display appearing when the target object is a stamp.

These photo album windows 181, 191 and 201 are identical in layout to the aforementioned photo album window 171 except for the target object, and so they will not be described in detail.

FIG. 14 shows a photo album window 211 which is an on-screen display appearing when the sample object create icon 114e is selected, using the touch pad 6, in the photo album window 121 shown in FIG. 5 or when the sample object create icon 114e is selected, using the touch pad 6, in the photo album window 171 shown in FIG. 10.

In the photo album window 211, there are displayed a sample line in the sample object display area 114b shown in FIGS. 5 and 10 and parameters for setting a thickness and color of the selected sample line and a color of the fringe.

The thickness parameter is indicated with a concrete numerical value and with an image easy to visually recognize, and the color parameter includes a plurality of kinds of color as a color pallet.

Further, the photo album window 211 provides also a preview display of sample lines whose attributes have been changed by setting the parameters. Also, the color parameters are easy to use by the user since a predetermined number of used colors are indicated differently from other colors not yet used.

FIG. 15 shows a photo album window 221 which is an on-screen display appearing when the sample object create icon 114e is selected, using the touch pad 6, in the photo album window 131 shown in FIG. 6 or when the sample object create icon 114e is selected, using the touch pad 6, in the photo album window 181 shown in FIG.

In the photo album window 221, there are displayed a sample figure in the sample object display area 114b shown in FIGS. 6 and 11 and parameters for setting a color of the selected sample figure and color and thickness of a line.

The thickness parameter is indicated with texts like "thin", "standard" and "thick" and the color parameter includes a plurality of kinds of color as a color pallet.

Further, the photo album window 221 provides a preview display of sample figures whose attributes have been changed by setting the parameters as in the photo album window 211. Also, the color parameters are easy to use by the user since a predetermined number of used colors are indicated differently from other colors not yet used.

FIG. 16 shows a photo album window 231 which is an on-screen display appearing when the sample object create icon 114e is selected, using the touch pad 6, in the photo album window 141 shown in FIG. 7 or when the sample object create icon 114e is selected, using the touch pad 6, in the photo album window 191 shown in FIG. 12.

In the photo album window 231, there are displayed parameters for setting a font, style, fringing, position, gradation, color, etc. of a sample character.

The font parameters include Japanese-style font and European-style font. The style parameters are indicated with texts like "bold", "italic" and "vertical writing". The position parameters are indicated with texts like "right", "horizontal center", "left", "upper", "vertical center" and "lower". The gradation parameters are indicated with those of sample pictures, and color parameters concern colors of the character itself, fringe, shadow, etc. and indicated in multiple kinds of colors as a color pallet.

Further, the photo album window 231 provides a preview display of sample figures whose attributes have been changed by setting the parameters as in the photo album windows 211 and 221. Also, the color parameters are easy to use by the user since a predetermined number of used colors are indicated differently from other colors not yet used.

Figure 17:
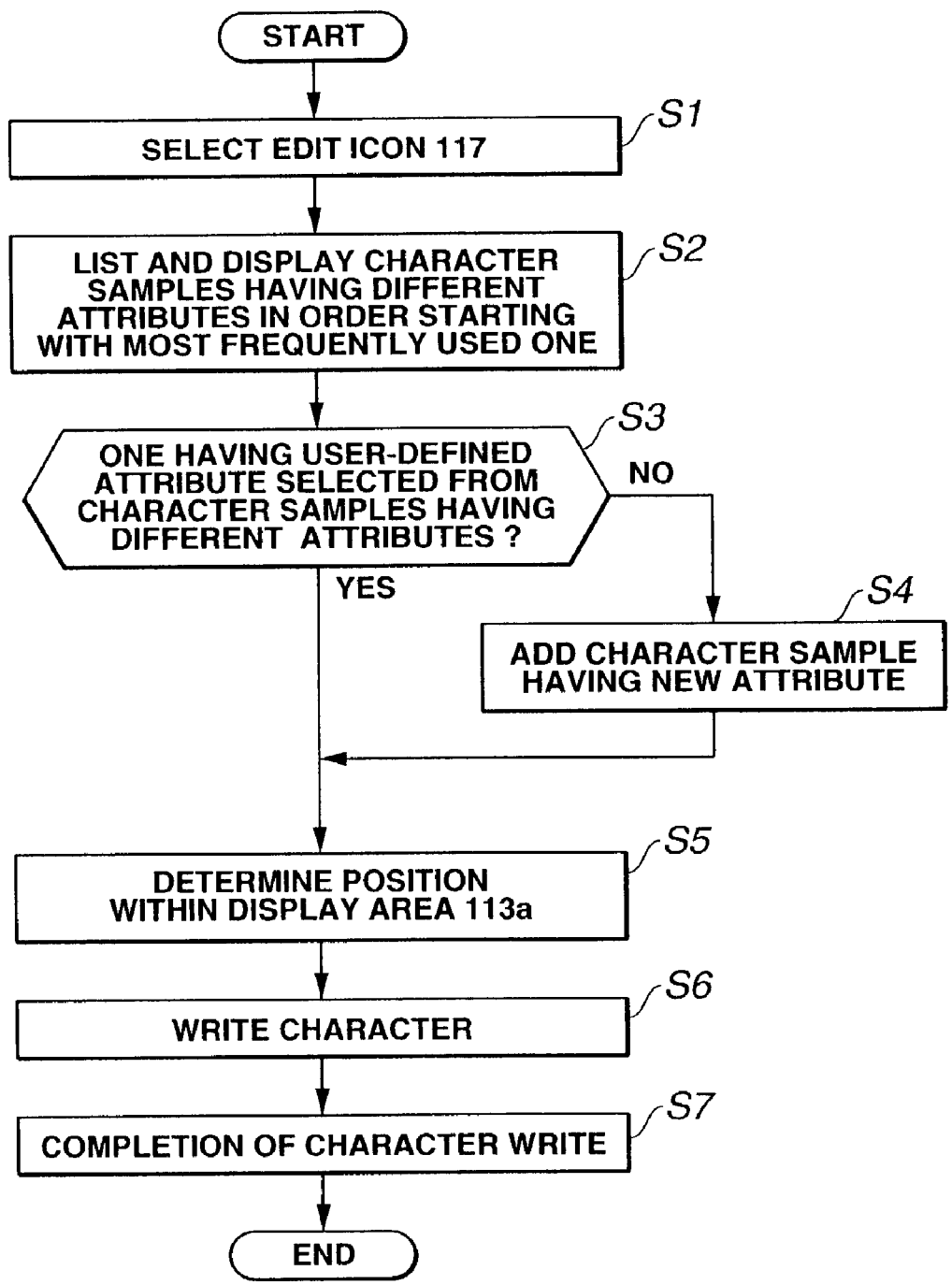
FIG. 17 shows a flow of operations made in adding a character taken as an example of the objects in the electronic photo album software executed by the notebook PC.

Next, the operations of th CPU 51 in the character addition mode in which a character as an example of the object is added to the picture display area 113a will be described with reference to the flow chart shown in FIG. 17. It is assumed here that in the initial status, the photo album window 111 shown in FIG. 4 appears on the LCD 7.

In step S1, the edit icon 117 in the edit mode select area 114a of the picture display section 114 is selected using the touch pad 6. That is, there is set the character addition mode for addition of a character to the picture display area 113a.

In step S2, the attribute processor 101 outputs a plurality of sample characters whose attributes are different from each other, the display control unit 102 selects the photo album window 141 shown in FIG. 7 and displays the plurality of sample characters different in attribute from each other in the descending order starting with the most frequently used one in the form of a list in the sample object display area 114b.

In step S3, it is determined whether a predetermined sample character has been selected, using the touch pad 6, from the listed plurality of sample characters whose attributes are different from each other, that is, whether a sample character whose attribute is as desired by the user has been selected. If no predetermined sample character has been selected, the CPU 51 goes to step S4. On the contrary, if the predetermined sample character has been selected, the CPU 51 goes directly to step S5 without going to step S4.

In step S4, the sample object create icon 114e is selected in the photo album window 141 in FIG. 7, the display control unit 102 selects the photo album window 231 in FIG. 16, a sample character having a new attribute is selected and added to the list.

In step 5, a position where a character is actually written (added) is determined in the picture display area 113a of the photo album window 141 shown in FIG. 7.

In step S6, it is possible to actually write a character on the basis of the attribute of the selected sample character first at the determined position, and the attribute processor 101 provides such a control as to write the character entered from the keyboard 5 on the basis of the attribute of the sample character.

In step S7, the enter key, for example, on the keyboard 5 is operated to exit the character write.

As having been described in the foregoing, the notebook PC 1 to which the present invention is applied can display sample objects in the form of a list in the sample object display area 114b on the LCD 7 as shown in FIGS. 5 to 9 when adding or changing an object to be displayed in the picture display area 113a where a picture is being displayed, under an electronic photo album software transferred from the hard disc built in the HDD 67 to the RAM 54.

Thus, the user can recognize the attribute of an object going to be added quickly and accurately, and intuitively search a desired sample object easily by operating the touch pad 6 to move the scroll bar 114d.

Further, the notebook PC 1 can list the sample objects displayed in the sample object display area 114b in the descending order starting with the most frequently used one, namely, accordingly to the user's intention. Thus, the notebook PC 1 can be used with a further improved convenience for a long term since the sample objects used by the user will be displayed at the top of the list.

Note that the present invention is not limited to the aforementioned embodiment but can be modified in various forms without departing from the spirit and scope thereof.

The present invention has been described concerning the one aspect in which the present invention is applied to a notebook PC 1, but according to another aspect, the present invention can be applied to a portable digital assistants (PDA) for example.

Figures 18A, 18B:
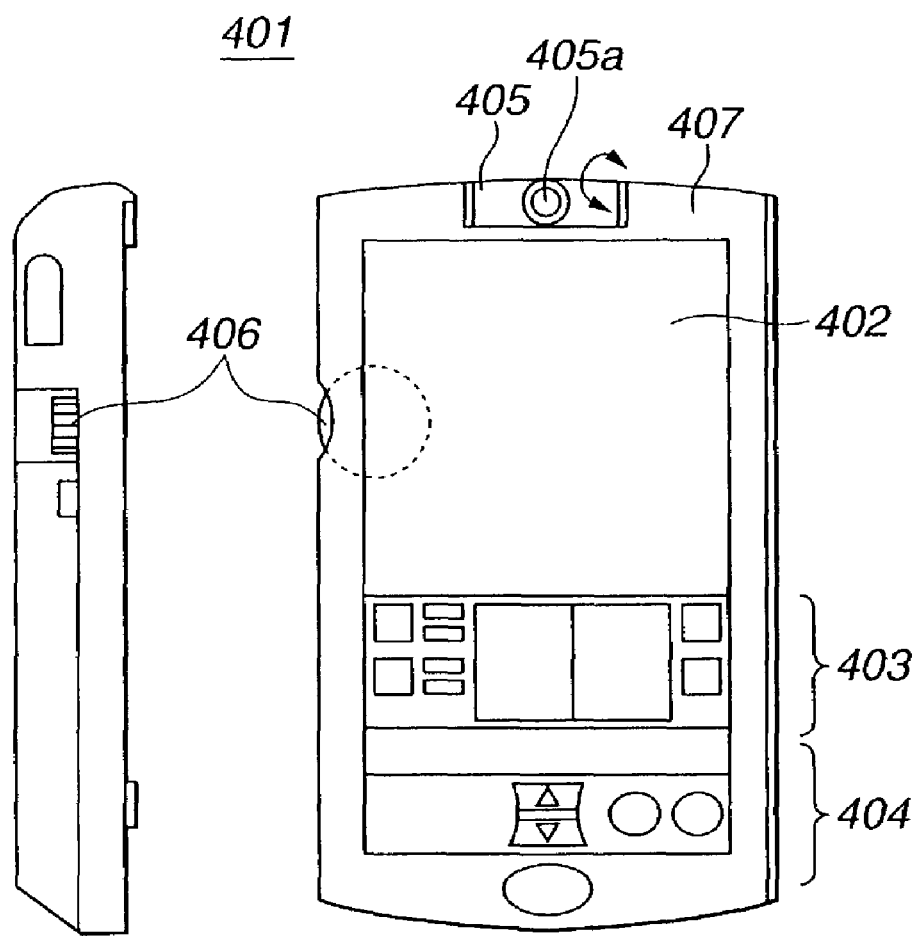
FIG. 18 shows the appearance of a PDA (portable digital assistants) as another example to which the present invention is also applicable.

Referring now to FIG. 18, a PDA is schematically illustrated in the forms of side elevation and front view. The PDA is generally indicated with a reference 401. As shown in FIG. 18(a), the PDA 401 has a housing 407 having provided on the front surface thereof a display section 402 being an liquid crystal display (LCD) which can provide a monochromatic or color display, a pen-operated input section 403 at which an operating pen or the like (not shown) is used to make an input, a control section 404 provided with controls to give a command or the like for starting up an application program installed in the PDA 401, and a camera 405 which acquires a picture of an object through a lens 405a and generates digitized picture information. As shown in FIG. 18(b), the PDA 401 is further provided with a rotatable dial 406 which gives the PDA 401 a command for execution of each of available kinds of picture processing.

As having been described in the foregoing, the information processor according to the present invention outputs a plurality of sample objects having different attributes, displays them in a predetermined order in the form of a list in the second display area of the display means, and provides such a control as to add or change the target object to be displayed in the first display area of the display means on the basis of the attribute of one selected, using the operating means, from the plurality of sample objects being displayed.

Thus, the user can quickly and accurately recognize the attribute of an object he is going to add without having to set each of the attributes which are combined in a great number of ways, and intuitively search a desired sample object easily since the sample objects are displayed in the form of a list.

Also, the information processing method according to the present invention outputs a plurality of sample objects having different attributes, displays them in a predetermined order in the form of a list in the second display area of the display means, and provides such a control as to add or change the target object to be displayed in the first display area of the display means on the basis of the attribute of one selected, using the operating means, from the plurality of sample objects being displayed and different in attribute from each other.

Thus, the user can quickly and accurately recognize the attribute of an object he is going to add without having to set each of the attributes which are combined in a great number of ways, and intuitively search a desired sample object easily since the sample objects are displayed in the form of a list.

Also, the information processing program according to the present invention outputs a plurality of sample objects having different attributes, displays them in a predetermined order in the form of a list in the second display area of the display means, and provides such a control as to add or change the target object to be displayed in the first display area of the display means on the basis of the attribute of one selected, using the operating means, from the plurality of sample objects being displayed and different in attribute from each other.

Thus, the user can quickly and accurately recognize the attribute of an object he is going to add without having to set each of the attributes which are combined in a great number of ways, and intuitively search a desired sample object easily since the sample objects are displayed in the form of a list.

What is claimed is:

1. An information processing apparatus which adds a target object having a character and/or figure in an image information displaying area, comprising:
   display control unit configured to display a plurality of sample objects whose type corresponds to an icon selected from a plurality of icons each of which represents type of an object to be added in a predetermined order in the form of an initial list; and
   attribute processor unit configured to apply attribute data of the sample object selected from the plurality of sample objects to the target object to be added;
   wherein said attribute processor unit generates a new sample object having new attribute data on the basis of a parameter changed by a user; and
   said display control unit displays a replacement list including both the selected sample object and the new sample object having new attribute data generated by said attribute processor unit, the replacement list replacing the initial list from which the sample object is initially selected.

2. The information processing apparatus according to claim 1, wherein the target object is a picture.

3. The information processing apparatus according to claim 1, wherein the attribute data of the target object added in the image information displaying area is changed into the attribute data of the sample object selected from the plurality sample objects if the target object is active.

4. An information processing method which adds a target object having a character and/or figure in an image information displaying area, comprising the steps of:
displaying a plurality of sample objects whose type corresponds to an icon selected from a plurality of icons each of which represents type of an object to be added in a predetermined order in the form of an initial list; and
applying attribute data of the sample object selected from the plurality of sample objects to the target object to be added;
wherein said applying attribute data step generates a new sample object having new attribute data on the basis of a parameter changed by a user; and
said displaying step displays a replacement list including both the selected sample object and the new sample object having new attribute data generated by an attribute processor, the replacement list replacing the initial list from which the sample object is initially selected.

5. The information processing method according to claim 4, wherein the attribute data of the target object added in the image information displaying area is changed into the attribute data of the sample object selected from the plurality of sample objects if the target object is active.

6. A computer readable medium encoded with a computer program which adds a target object having a character and/or figure in an image information displaying area, the program comprising the steps of:
displaying a plurality of sample objects whose type corresponds to an icon selected from a plurality of icons each of which represents type of an object to be added in a predetermined order in the form of an initial list; and
applying attribute data of the sample object selected from the plurality of sample objects to the target object to be added;
wherein said applying attribute data step generates new sample object having new attribute data on the basis of a parameter changed by a user; and
said displaying step displays a replacement list including both the selected sample object and the new sample object having new attribute data generated by an attribute processor, the replacement list replacing the initial list from which the sample object is initially selected.

7. The computer program according to claim 6, wherein the attribute data of the target object added in the image information displaying area is changed into the attribute data of the sample object selected from the plurality of sample objects if the target object is active.

* * * * *